US006917417B2

United States Patent
Strege et al.

(10) Patent No.: US 6,917,417 B2
(45) Date of Patent: *Jul. 12, 2005

(54) METHOD AND APPARATUS FOR INFORMATION TRANSFER IN VEHICLE SERVICE SYSTEMS

(75) Inventors: Timothy A. Strege, Ballwin, MO (US); David A. Voeller, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/871,241

(22) Filed: Jun. 18, 2004

(65) Prior Publication Data

US 2004/0227934 A1 Nov. 18, 2004

Related U.S. Application Data

(63) Continuation of application No. 09/880,571, filed on Jun. 13, 2001, now Pat. No. 6,754,562.

(51) Int. Cl.[7] ............................................. G01B 22/275
(52) U.S. Cl. .................. 356/139.09; 700/279; 356/155; 280/86.75; 33/288
(58) Field of Search .................... 700/279; 356/139.09, 356/155; 280/86.75; 33/288

(56) References Cited

U.S. PATENT DOCUMENTS

| 4,381,548 A | 4/1983 | Grossman et al. |
|---|---|---|
| 4,761,749 A | 8/1988 | Titsworth et al. |
| RE33,144 E | 1/1990 | Hunter et al. |
| 5,489,983 A | 2/1996 | McClenahan et al. |
| 5,870,315 A | 2/1999 | January |
| 5,892,437 A | 4/1999 | Scheibe et al. |
| 6,085,428 A | 7/2000 | Casby et al. |
| 6,389,337 B1 | 5/2002 | Kolls |
| 6,405,111 B2 | 6/2002 | Rogers et al. |
| 6,574,877 B2 | 6/2003 | Gray et al. |
| 6,754,562 B2 | 6/2004 | Strege et al. |
| 2002/0085520 A1 * | 7/2002 | Sydon et al. ................ 370/335 |

OTHER PUBLICATIONS

Bluetooth Security Architecture; Version 1.0; Jul. 15, 1999; Muller, Thomas; Doc. #1.C.116/1.0; 33 pgs. The Official Bluetooth Website; 3 pgs.

Bluetooth Protocol Architecture; Version 1.0; Aug. 25, 1999; Mettala, Riku; Doc #1.C.120/1.0; 20 pgs. Bluetooth onboard; Engineering News; Apr. 4, 2001; 1 pg.

* cited by examiner

Primary Examiner—Thomas H. Tarcza
Assistant Examiner—Brian Andrea
(74) Attorney, Agent, or Firm—Polster, Lieder, Woodruff & Lucchesi, L.C.

(57) ABSTRACT

A vehicle service system having a vehicle service computer which is configured for communication with one or more on-board vehicle computers of a vehicle undergoing a vehicle service procedure, to retrieve or access information stored in a memory associated with the vehicle computer and/or to modify or store information in the vehicle computer associated memory.

50 Claims, 4 Drawing Sheets

METHOD AND APPARATUS FOR INFORMATION TRANSFER IN VEHICLE SERVICE SYSTEMS

CROSS-REFERENCE TO RELATED APPLICATIONS

This application is a continuation of, and claims priority from, U.S. patent application Ser. No. 09/880,571 filed on Jun. 13, 2001 now U.S. Pat. No. 6,754,562, and published as U.S. Patent Application Publication No. 2002/0193910 A1 on Dec. 19, 2002.

STATEMENT REGARDING FEDERALLY SPONSORED RESEARCH

Not Applicable.

BACKGROUND OF THE INVENTION

The present invention related generally to vehicle service systems having a computer configured to receive information to be utilized in performing a vehicle service, and more particularly, to a vehicle wheel alignment system having computers configured to utilize wireless communications protocols to identify and communicate with a variety of proximally located external devices for the purpose of establishing communication links.

Traditional vehicle wheel alignment systems, such as shown in U.S. Pat. No. 4,381,548 to Grossman et al., herein incorporated by reference, utilize a computing device, typically a general purpose or IBM-PC compatible computer, configured with wheel alignment software, which is connected to one or more vehicle wheel alignment angle sensors. The computing device is configured with software to compute angular relationships of the vehicle wheel, as is described in U.S. Reissue Pat. No. 33,144 to Hunter, et al. herein incorporated by reference, and typically is in communication with a variety of conventional input and output devices, such as keyboards, pointing devices, printers, displays, and audio components. Traditional vehicle wheel alignment sensors comprise angle transducers, such as shown in U.S. Pat. No. 5,489,983 to McClenahan et al., herein incorporated by reference, which are mounted to the wheels of a vehicle undergoing an alignment service, but may comprise camera systems, such as shown in U.S. Pat. No. 5,870,315 to January, herein incorporated by reference, designed to observe either the wheels themselves or targets mounted to the wheels, and to generate images from which alignment angles may be determined by the computing device.

In prior art wheel alignment systems, the individual wheel alignment sensors are connected to the computing device by means of data communication cables. As the wheel alignment systems evolved, the data communication cables have been replaced by wireless communications technologies such as infrared and radio-frequency communication links, wherein the computing device serves as a controller, transmitting instructions to the individual wheel alignment sensors, and receiving wheel alignment information in response. To avoid conflicting communications, individual wireless wheel alignment sensors employ a passive communications system which transmits information to the computing device only in response to specific instructions received therefrom.

In addition to requiring information from individual wheel alignment sensors, a wheel alignment system or other vehicle service system computing device requires information identifying the type of sensors which it is utilizing, information related to the vehicle undergoing service, and information identifying the manner and format of any output provided to the operator or technician. These various pieces of information are traditionally entered into the computing device manually, via the conventional input devices such as the keyboard or mouse.

Emerging wireless communication technology, such as the Bluetooth wireless communications protocol, enables devices and appliances to interconnect in the form of a mobile and amorphous network capable of continually reconfiguring as elements are added and removed. Bluetooth technology allows easy connection between devices and components, such as smart handheld devices and stand-alone equipment (i.e. general purpose computers to peripherals, etc) without the restrictions of cables or wires. Devices employing the Bluetooth communications protocol can connect with multiple similarly configured devices located within a close proximity, forming a high-speed data network. The Bluetooth communications protocols include user authentication, data encryption and data hopping facilities to protect privacy and to automatically prevent signal interference and loss. These protocols enable automatic synchronization between Bluetooth-enabled devices.

As manual entry of information can be time consuming and repetitive, it would be advantageous to provide a vehicle wheel alignment system wherein individual components were capable of automatically accessing and communicating with a wireless micro-network including a variety of devices located in proximity to the wheel alignment or vehicle service system, and for automatically acquiring from or delivering to, these devices at least a portion of the information required to complete a vehicle wheel alignment or vehicle service procedure.

BRIEF SUMMARY OF THE INVENTION

Briefly stated, in one aspect, the present invention comprises an improved vehicle service system wherein a computing device is configured for active wireless communication with any of a variety of similarly configured external components and devices brought into proximity with the computing device, including, but not limited to, sensors, input and output devices, mobile computers, on-board vehicle computers, and other vehicle service equipment.

In a second aspect, the present invention comprises an improved vehicle wheel alignment system wherein the computing device is configured to utilize a low-power radio-frequency transceiver operating in the 2.4 MHz ISM band, modulated by a Gaussian frequency shift keying to communicate with any of a variety of similarly configured external components and devices brought into communications proximity with the computing device. The computing device and the devices with which it is in communication forming a loosely-coupled wireless communications micro-network into which components and devices may be added and removed without disruption.

In a third aspect, the present invention comprises an improved vehicle wheel alignment system wherein the computing device is configured to utilize a wireless Bluetooth communications protocol to communicate with any of a variety of similarly configured external components and devices brought into communications proximity with the computing device, including, but not limited to, alignment sensors, input and output devices, mobile computers, on-board vehicle computers, and other vehicle service equipment.

In a fourth aspect, the present invention comprises an improved vehicle wheel alignment system wherein the computing device is configured to utilize a wireless communications protocol to communicate with at least one similarly configured processor on-board a vehicle being serviced to retrieve information stored in a memory associated with the vehicle processor, vehicle system data, and/or to store information in the vehicle processor associated memory. Such information may include, but is not limited to, OEM vehicle alignment specifications, vehicle operating parameters, previous vehicle alignment measurements, and current vehicle alignment measurements.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

Figure 1:
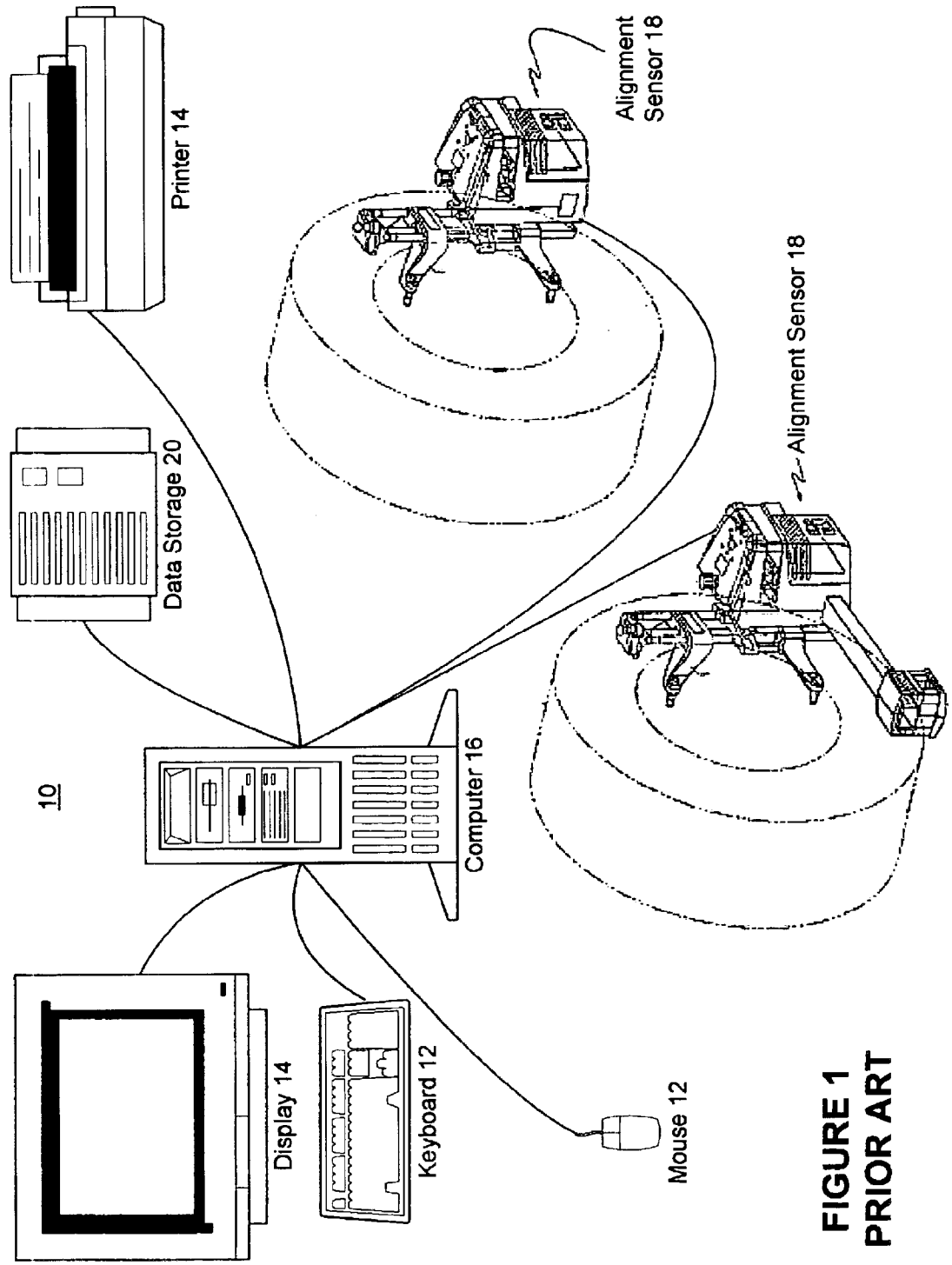
FIG. 1 is an overview of prior art components in a vehicle wheel alignment system.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Turning to the figures, there is shown the components of a conventional vehicle wheel alignment system generally at 10. The vehicle alignment system 10 includes at least one input device 12, such as a keyboard, mouse, microphone, or touch screen, for use by an operator or technician (not shown) to communicate with the vehicle alignment system 10, and at least one output device 14, such as a display or audio speaker for the alignment system 10 to convey information to the operator or technician.

Depending upon the needs of the operator or technician, the input and output devices may include, but are not limited to, one or more of the following conventional devices such as a keyboard, a pointing device, a remote control device, a monitor or LCD display, or audio components. The devices can be integrated together in a console, or located separately, again depending upon the needs of the operator and the configuration of the wheel alignment system 10.

The input devices 12 and output devices 14 are in communication with a computing device 16 such as a wheel alignment computer, operating under control of one or more software programs or components. The computing device 16 can be any computing device used with systems of complexity similar to that of a vehicle wheel alignment system. For example, a micro-processor, a micro-controller, a digital signal processor having sufficient computing power, or a general purpose computer can be used as the computing device. Of course, any equivalent device, i.e. one capable of executing the requisite software programs or components, can also be used. Communication between the input devices 12, output devices 14, and the computing device 16 can be performed electronically or electro-magnetically (including optical communications such as infrared system), or by any combination thereof.

The computing device 16 of the vehicle wheel alignment system 10 is additionally suitably connected to at least one alignment angle sensing device 18 for obtaining measurements of the various alignment angles and/or characteristics of a vehicle under test. The sensing devices 18, depending upon the application and requirements, can be electronic, electromechanical, or optical. The sensing devices 18 can be hard-wired to the computing device 16 for communication therewith, or can be in communication with the computing device 16 in any other suitable manner, such as through infrared or radio-frequency communication.

In addition to the input devices 12, output devices 14, and sensing devices 18, the computing device 16 of the vehicle wheel alignment system 10 can be configured with access to an internal or external data storage component (collectively identified as 20), and to various peripheral components, such as printers, CD-ROM drives, DVD-drives, and/or a communications network such as the Internet.

Figure 2:
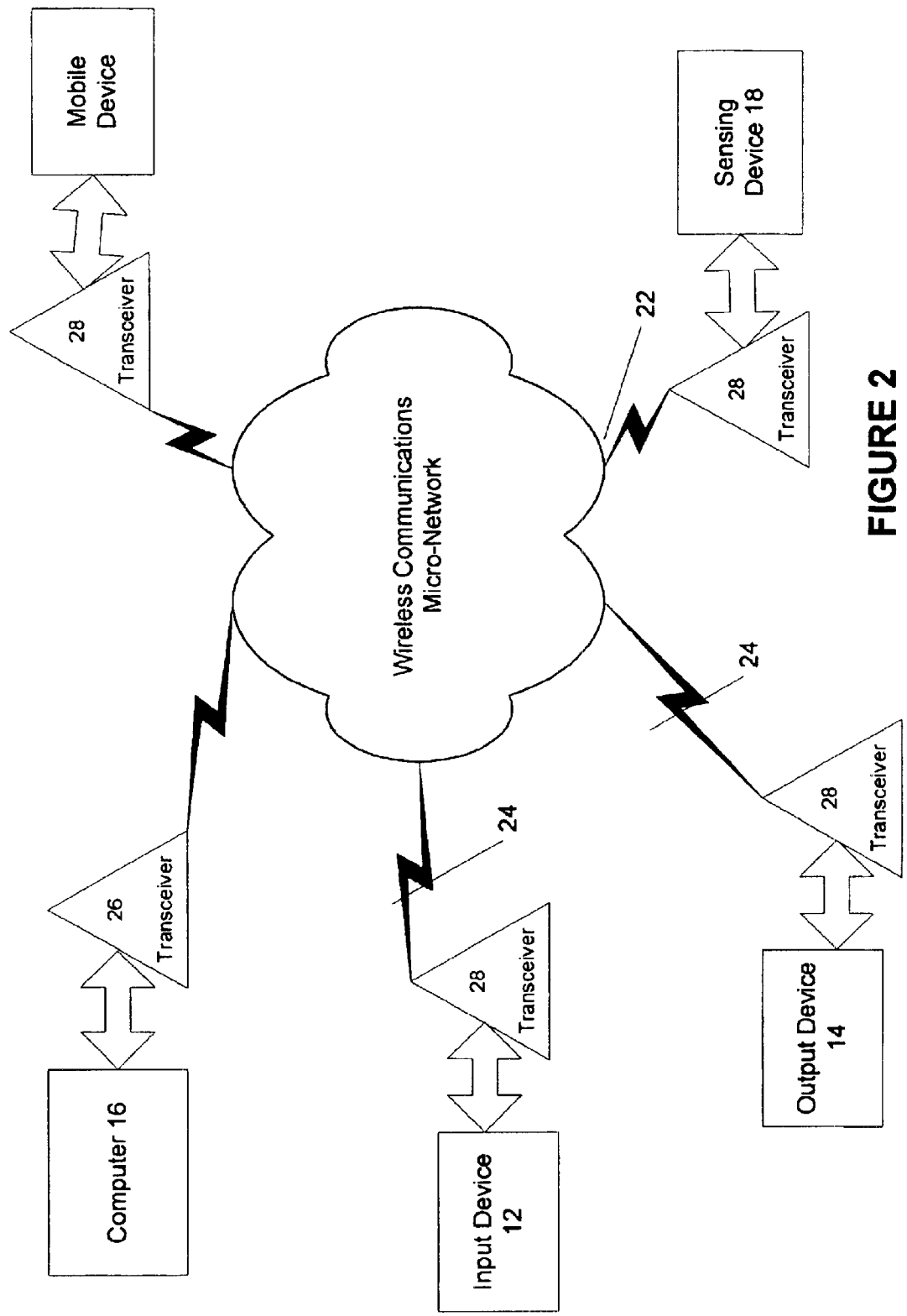
FIG. 2 is block diagram illustrating various components of a vehicle wheel alignment system of the present invention linked to a wireless communications micro-network.

It is preferred that at least one of the communication links between the computing device 16 and either the input devices 12, output devices 14, and sensing devices 18 be a wireless communications link. Such communications links are shown in FIG. 2, in which the links between the computing device 16 and at least one sensing device 18 are labeled 22, and the link between the computing device 16 and an input or output device is labeled 24.

In the preferred embodiment, a wireless communications system and protocol known as Bluetooth is employed to automatically establish the wireless communications link 22 and/or 24, forming a wireless micro-network such as a piconet, comprising two to eight communicating devices sharing a communications link, or a scatternet, comprising two or more interconnecting piconets. Alternative wireless communications systems and protocols may be employed for establishing a wireless communication link between devices to form a micro-network. Such systems and protocols, which can be employed with the present invention include HomeRF and Wireless Fidelity, also known as Wi-Fi, or the IEEE 802.11B standard, although such systems and protocols may not automatically establish communication links, but rather require individual links to be manually initiated.

To establish a Bluetooth wireless communications link, a first radio transceiver 26 is associated with the computing device 16, and a second radio transceiver 28 is associated with each other device to which a wireless communications link is to be established, such as an input device 12, output device 14, or sensing device 18.

The first and second radio transceivers 26, 28 are configured to automatically find and contact each other to establish a wireless communications link upon being brought into proximity with each other. Proximity for purposes of establishing a low-power wireless communications link is approximately 10 meters or less with current Bluetooth systems, and for establishing a high-power wireless communications link is 100 meters or less with current Bluetooth systems. However, those of ordinary skill in the art will recognize that this distance may vary with the communications protocols and technology employed, and as such, may be increased with future versions of Bluetooth. Systems utilizing the Bluetooth communications protocol transmit, using a preferred communications format, a general inquiry (or in some cases, a limited inquiry), which is received and acknowledged by similarly configured devices located within receiving range. Once a second Bluetooth configured device is identified, a link is established and authenticated.

Figure 3:
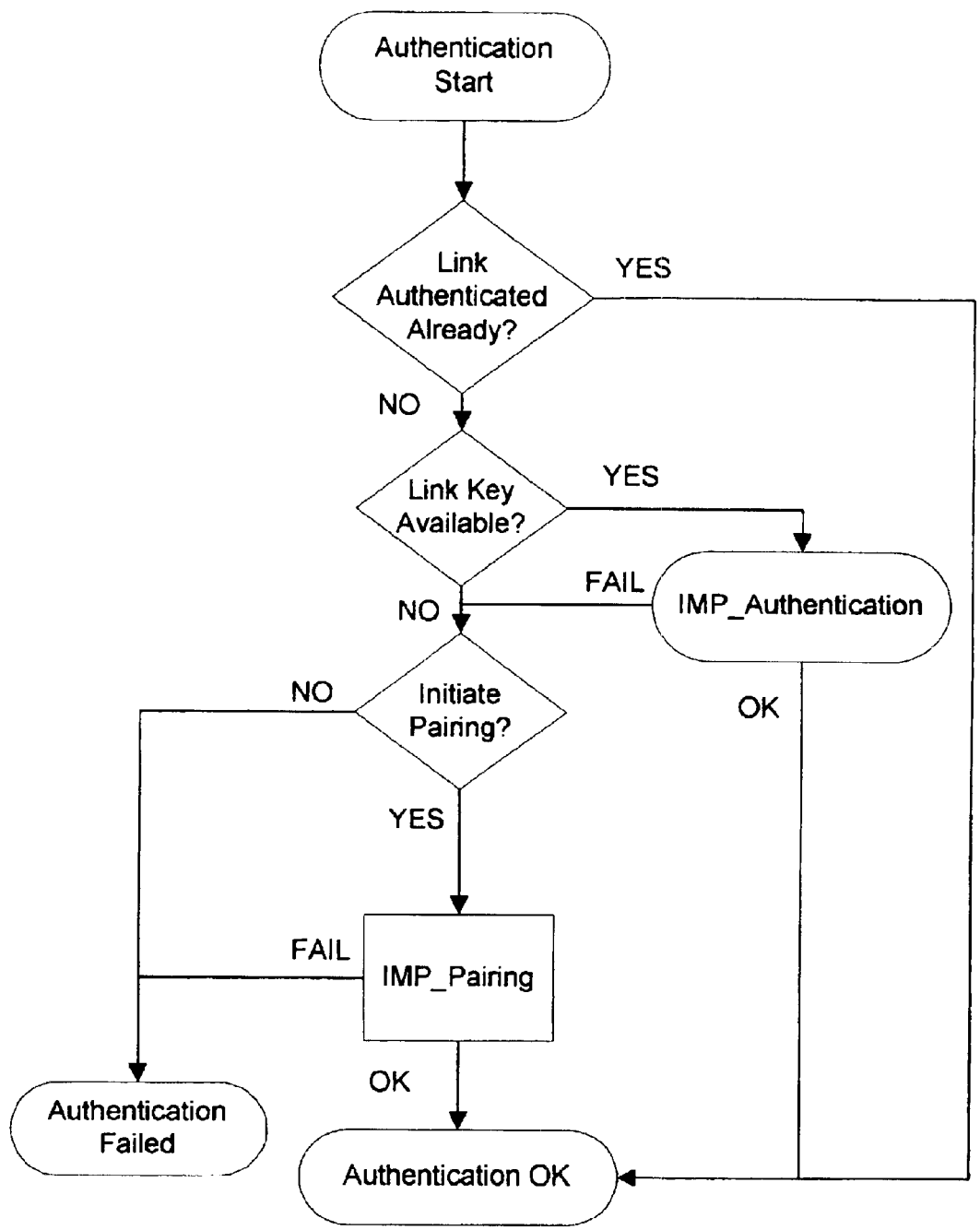
FIG. 3 is a flow-chart illustrating a Bluetooth link authentication procedure.

Establishing a Bluetooth link authentication involves a sequence of steps, a portion of which are shown in FIG. 3. First, the initiating Bluetooth system checks to see if a link between the two communicating devices has already been previously established. If a link has been previously established, the authentication is automatically accepted by the initiating Bluetooth device. For the first time only that two devices communicate, an initialization procedure is needed to create a common link key in a safe manner. This procedure is called pairing.

An authentication procedure first checks to see if a link between the two devices has been already authenticated. If so, the authentication is confirmed. If the link between the two devices is not currently authenticated, but a common link key exists between the two devices (from a previous link), the authentication procedure re-authenticates the link. If the re-authentication fails, or if there are no common link keys available between the two devices, the authentication procedure initiates the pairing procedure to generate a new set of link keys between the two devices. Successful completion of the pairing procedure results in the establishment of an authenticated link between the two devices. A complete description of the Bluetooth authentication procedures may be found in the Bluetooth White Paper entitled "Bluetooth Security Architecture", Version 1.0, published Jul. 15, 1999. Those of ordinary skill in the art will further recognize that a variety of authentication procedures may be implemented to compliment different communications protocols.

Turning again to FIG. 2, it can be seen that the vehicle wheel alignment system 10 of the present invention can include wireless communications links with both fixed and mobile devices to establish a micro-network. For example, the transceiver 26 associated with the wheel alignment system 10 is fixed, while a second transceiver 28 associated with a portable display unit is mobile. Devices with which the vehicle wheel alignment system 10 of the present invention can establish a communications link include, but are not limited to computers associated with a vehicle undergoing service, customer computers (laptops and PDAs), input and/or output devices, and other vehicle service equipment.

For example, if a motor vehicle 100 equipped with a suitable transceiver 28 is brought into proximity with a vehicle wheel alignment system 10 of the present invention configured with a transceiver 26 and suitable communications protocols, a communications link will be automatically established between the vehicle 100 and the alignment system 10. In the case of a motor vehicle 100, the suitable transceiver 28 can comprise a self-contained device built in to the vehicle systems, or may comprise a detachable unit designed to plug in to an access point to the vehicle's diagnostic systems, thereby providing wireless access thereto. Utilizing this communications link, the vehicle wheel alignment system 10, or other vehicle service system, can obtain required information directly from the vehicle 100 without the need for the operator or technician to manually enter the data or connect cables from the vehicle's computers to the alignment system.

Such information can include, but is not limited to, diagnostic information stored in the vehicle's electronic control module (ECM), the vehicle identification number (VIN), vehicle tire pressure from associated pressure sensors, stored error codes, steering wheel position encoder signals, electronic ride-height system signals, rear wheel steering information, brake actuation signals, engine status information, power steering status information, and throttle position sensor signals. In the context of a vehicle brake testing system, information which may be communicated from the vehicle to the service system can include, but is not limited to, braking system status, braking hydraulic pressure readings, brake pedal pressure, tire pressure, and vehicle wheel speed.

Additional information which can be stored in a vehicle computer, and communicated to the vehicle wheel alignment system 10 or other vehicle service device over the wireless communications link can include vehicle specifications and previous vehicle service information such as previous alignment measurements, last service date, and the name or location of the service shop performing the last vehicle service.

In addition to receiving information from a vehicle 100, the vehicle wheel alignment system 10, or other vehicle service system, can communicate via the wireless communications micro-network with integrated sensors and components on the vehicle to direct their operation, or to store data in an onboard vehicle storage memory. For example, upon completion of a vehicle wheel alignment procedure, the vehicle wheel alignment system 10 of the present invention can communicate the vehicle's current alignment measurements to the vehicle storage memory via the wireless communications micro-network.

It is preferred that the transceivers of the system operate in the 2.4 GHz Industrial Scientific and Medical (ISM) band to establish the wireless communications micro-network, which is standard for communications devices employing the Bluetooth communications protocols. Those of ordinary skill in the art will readily recognize that the wireless communication between the various devices and the wheel alignment system 10 of the present invention can utilize a wide range of frequency bandwidths, as is appropriate in the environment within which they are intended to operate.

Each of the transceivers 26, 28 is preferably a low-powered device, having a maximum output power of substantially not more than 100 mW in high-power mode, and 10 mW in low-power mode, as is consistent with devices employing the current Bluetooth communications protocols. Such low power transceivers 26, 28 are particularly suited for use with a vehicle wheel alignment system 10 operating in an enclosed vehicle service center, and which are unlikely to require communication with devices other than those located within the proximity of the vehicle service center. However, an output power of greater than 100 mW could be used with different communication protocols or future Bluetooth protocols.

It is anticipated that a vehicle wheel alignment system 10 of the present invention can simultaneously be in wireless communication with more than one similarly configured device, thereby establishing an adaptable wireless communications micro-network wherein data can be exchanged between the devices. As additional devices move, or are brought into, communications proximity to the wireless network, they are automatically or manually added to the network if they are successfully authenticated. Alternatively, as devices move, or are removed, from communications proximity to the wireless network, they are removed from the network.

In contrast with passive network prior art systems wherein a single device functions as a network control device, transmitting instructions to connected devices, and receiving information there from only in response to the transmitted instructions, the wireless micro-network of the present invention permits active bidirectional communication and information exchange between any interconnected devices, with the communication or information exchange being initiated by either of the devices.

Figure 4:
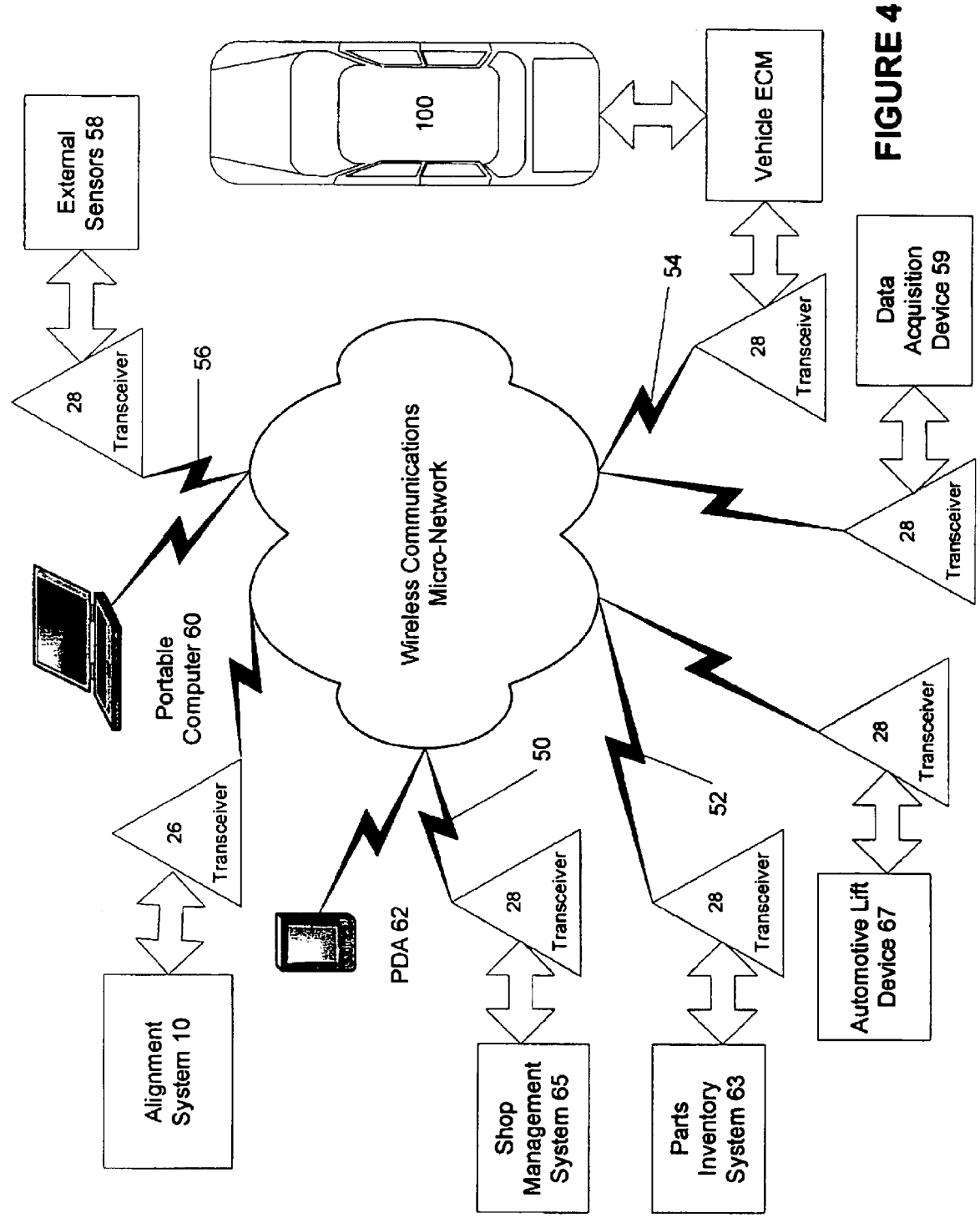
FIG. 4 is a block diagram illustrating exemplary external systems which may be in wireless communication via the micro-network with the wheel alignment system of the present invention.

Referring to FIG. 4, a vehicle wheel alignment system 10 of the present invention is shown configured with a first wireless communications transceiver 26 and suitable communications protocols as described above. FIG. 4 provides a visual representation of exemplary wireless communications links forming a wireless micro-network which can be established between the vehicle wheel alignment system 10 and an exemplary variety of external devices during a typical vehicle wheel alignment service procedure. In addition to wireless links to standard input and output components 12, 14 such as keyboards, headsets, audio devices, and display units, prior to the arrival of a vehicle 100 at the vehicle wheel alignment system 10, wireless communications links 50 and 52 can be established between the vehicle wheel alignment system 10 and one or more service shop supporting computers, such as a shop management system and a parts inventory system. These links 50, 52 can be maintained throughout an entire vehicle service procedure, so long as the devices remain within the required proximity, and information exchanged over them can include items such as lists of scheduled service appointments, customer information, and parts inventory information. Links to external networks, such as the Internet can also be provided through the wireless links 50, 52 to associated computer systems.

When a vehicle 100 is brought into proximity to the vehicle wheel alignment system 10, additional wireless communication links can be established. For example, a link 54 can be established directly to the vehicle's electronic control module (ECM) and on-board sensors if the vehicle is configured with a suitable transceiver, or can be established indirectly thereto through a plug-in transceiver module connected to the vehicle's ECM system. Information acquired directly from the vehicle through link 54 can include the vehicle VIN, prior service history, current vehicle status, live vehicle sensor readings, and any information stored in on-board vehicle memory storage.

Additional wireless communications links 56 can be established to one or more external sensors 58 or data acquisition devices 59 utilized to acquire data and measurements related to the vehicle 100. For example, individual wheel-mounted alignment angle sensors can be provided with suitable transceivers and communications protocol to establish communication links to the wireless micro-network, rendering sensor data and measurements available to any similarly connected components as well as permitting the vehicle wheel alignment system 10 to control the sensors.

During a wheel alignment procedure or other vehicle service, the vehicle wheel alignment system 10 may communicate via the wireless micro-network with any of a variety of input and output devices configured with suitable transceivers and wireless communications protocols. In addition, wireless communications links may be established to portable computers 60 or PDAs 62 brought into proximity to the vehicle wheel alignment system 10, and information exchanged therewith.

For example, upon completion of a vehicle wheel alignment procedure or other vehicle service, a customer's PDA 62 or laptop computer 60, may receive from the vehicle wheel alignment system 10 an indication that the service has been completed, as well as an update of the results. In response, the PDA 62 or laptop computer 60 may provide payment authorization from the customer to the vehicle wheel alignment system 10. Communication links may further be established to a parts inventory system 63, a shop management system 65, or other vehicle service components, such as an automotive lift rack 67.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An improved vehicle service system having a computing device, an associated display, and at least one sensor configured for communication with the computing device for communicating vehicle data, said improvement comprising:

a transceiver unit associated with said computing device, said transceiver configured to establish an active bi-directional communications link between said computing device and a vehicle computer associated with a vehicle in proximity to said improved vehicle service system; and wherein said computing device is configured to utilize said communications link to receive data from said vehicle computer, and to store updated data in an onboard memory of said vehicle computer.

2. The improved vehicle service system of claim 1 wherein said updated data includes one or more current vehicle measurements.

3. The improved vehicle service system of claim 1 wherein said computing device is configured to utilize said communications link to receive at least one stored error code from said vehicle computer.

4. The improved vehicle service system of claim 1 wherein said computing device is configured to utilize said communications link to direct said vehicle computer to reset at least one stored error code.

5. The improved vehicle service system of claim 1 wherein said computing device is configured to utilize said communications link to receive steering wheel position data from said vehicle computer.

6. The improved vehicle service system of claim 1 wherein said computing device is configured to utilize said communications link to update steering wheel position data stored in a memory associated with said vehicle computer.

7. The improved vehicle service system of claim 1 wherein said computing device is configured to utilize said communications link to direct the operation of at least one component of said vehicle.

8. The improved vehicle service system of claim 7 wherein said component is an electrically controlled ride-height system.

9. The improved vehicle service system of claim 7 wherein said component is a rear-wheel steering system.

10. The improved vehicle service system of claim 7 wherein said component is a vehicle braking system.

11. The improved service system of claim 1 wherein said transceiver unit associated with said computing device is configured to establish a wireless communications link between said computing device and a vehicle computer associated with a vehicle in proximity to the improved vehicle service system.

12. The improved service system of claim 1 further including a data communications cable; and wherein said transceiver unit associated with said computing device is configured to establish a communications link over said data communications cable between said computing device and a vehicle computer associated with a vehicle in proximity to the improved vehicle service system.

13. A vehicle wheel alignment system having a computing device configured with at least one vehicle wheel alignment software application, an associated display, and at least one wheel alignment angle sensing device operatively coupled to the computing device, comprising:
   a transceiver unit associated with said wheel alignment system computing device, said transceiver configured to establish a communications link between said wheel alignment system computing device and a vehicle electronic control module associated with a vehicle; and
   wherein said vehicle wheel alignment system computing device is configured to utilize said communications link to receive data from said vehicle electronic control module.

14. The vehicle wheel alignment system of claim 13 where said vehicle wheel alignment system computing device is further configured to utilize said communications link to convey data to said vehicle electronic control module.

15. The vehicle wheel alignment system of claim 13 where said vehicle wheel alignment system computing device is further configured to utilize said communications link to direct operation of said vehicle electronic control module.

16. The vehicle wheel alignment system of claim 13 wherein said vehicle wheel alignment system computing device is configured to utilize said communications link to receive at least one error code from said vehicle electronic control module.

17. The vehicle wheel alignment system of claim 13 where said vehicle wheel alignment system computing device is further configured to utilize said communications link to direct said vehicle electronic control module to reset at least one error code.

18. The vehicle wheel alignment system of claim 13 wherein said vehicle wheel alignment system computing device is configured to utilize said communications link to receive steering system data from said vehicle electronic control module.

19. The vehicle wheel alignment system of claim 18 wherein said steering system data includes a steering wheel position signal.

20. The vehicle wheel alignment system of claim 18 wherein said steering system data includes rear wheel steering information.

21. The vehicle wheel alignment system of claim 13 wherein said vehicle wheel alignment system computing device is configured to utilize said communications link to receive ride-height system data from said vehicle electronic control module.

22. The vehicle wheel alignment system of claim 13 where said vehicle wheel alignment system computing device is further configured to utilize said communications link to store data associated with a steering system in said vehicle electronic control module.

23. The vehicle wheel alignment system of claim 13 where said vehicle wheel alignment system computing device is further configured to utilize said communications link to direct operation of a vehicle electrically controlled ride-height system through said vehicle electronic control module.

24. The vehicle wheel alignment system of claim 13 where said vehicle wheel alignment system computing device is further configured to utilize said communications link to direct operation of a vehicle steering system through said vehicle electronic control module.

25. The vehicle wheel alignment system of claim 13 wherein said transceiver unit associated with said wheel alignment system computing device is configured to establish a wireless communications link between said wheel alignment system computing device and a vehicle electronic control module associated with a vehicle.

26. The vehicle wheel alignment system of claim 13 further including a data communications cable; and wherein said transceiver unit associated with said wheel alignment system computing device is configured to establish a communications link over said data communications cable between said wheel alignment system computing device and a vehicle electronic control module associated with a vehicle.

27. A method for transferring information between a vehicle wheel alignment system and a vehicle computer, comprising:
   establishing a communication link between the vehicle computer and the vehicle wheel alignment system;
   transferring, on said established communications link, information from the vehicle computer to the vehicle wheel alignment system in response to at least one request from the vehicle wheel alignment system;
   performing, with the vehicle wheel alignment system, one or more service procedures on a vehicle associated with the vehicle computer; and
   transferring, on said established communications link, information from the vehicle wheel alignment system to the vehicle computer subsequent to a completion of said one or more service procedures on said vehicle.

28. The method of claim 27 further including the step of storing said information in a data storage device associated with the vehicle computer.

29. The method of claim 27 for transferring information between a vehicle wheel alignment system and a vehicle computer further comprising the step of:
   operatively coupling the vehicle computer to at least one removable transceiver configured for wireless communication with the vehicle wheel alignment system prior to establishing said communications link; and
   wherein said step of establishing a communication link includes establishing a wireless communications link between said at least one removable transceiver and the vehicle wheel alignment system.

30. The method of claim 27 for transferring information between a vehicle wheel alignment system and a vehicle computer further comprising the step of:
   operatively coupling the vehicle computer to at least one data communications cable for communication with the vehicle wheel alignment system prior to establishing said communications link; and
   wherein said step of establishing a communication link includes establishing a communications link between said vehicle computer and the vehicle wheel alignment system over said data communications cable.

31. A method for transferring information between a vehicle wheel alignment system and a vehicle electronic control module, comprising:
 establishing a communication link between the vehicle electronic control module associated with a vehicle and the vehicle wheel alignment system; and
 transferring, on said established communications link, diagnostic information from the vehicle electronic control module to the vehicle wheel alignment system in response to at least one request from the vehicle wheel alignment system.

32. The method of claim 31 for transferring information between a vehicle wheel alignment system and a vehicle electronic control module further including the step of transferring, on said established communications link, at least one command from the vehicle wheel alignment system to the vehicle electronic control module, said at least one command configured to direct the operation of at least one vehicle component.

33. The method of claim 31 for transferring information between a vehicle wheel alignment system and a vehicle computer wherein said step of establishing a communication link includes establishing a wireless communications link between said vehicle electronic control module and the vehicle wheel alignment system.

34. The method of claim 31 for transferring information between a vehicle wheel alignment system and a vehicle computer wherein said step of establishing a communication link includes coupling a data communications cable between said vehicle electronic control module and the vehicle wheel alignment system.

35. The method of claim 31 for transferring information between a vehicle wheel alignment system and a vehicle electronic control module further including the step of transferring data on said established communications link from said vehicle wheel alignment system to said vehicle electronic control module.

36. The method of claim 35 for transferring information between a vehicle wheel alignment system and a vehicle electronic control module further including the step of storing said data in a data storage device associated with the vehicle electronic control module.

37. The method of claim 31 for transferring information between a vehicle wheel alignment system and a vehicle electronic control module wherein said diagnostic information from the vehicle electronic control module to the vehicle wheel alignment system includes at least one stored error code.

38. The method of claim 31 for transferring information between a vehicle wheel alignment system and a vehicle electronic control module wherein said diagnostic information from the vehicle electronic control module to the vehicle wheel alignment system includes steering system information.

39. The method of claim 38 for transferring information between a vehicle wheel alignment system and a vehicle electronic control module wherein said diagnostic information from the vehicle electronic control module to the vehicle wheel alignment system includes steering wheel position data.

40. The method of claim 31 for transferring information between a vehicle wheel alignment system and a vehicle electronic control module wherein said diagnostic information from the vehicle electronic control module to the vehicle wheel alignment system includes rear wheel steering system data.

41. The method of claim 31 for transferring information between a vehicle wheel alignment system and a vehicle electronic control module wherein said diagnostic information from the vehicle electronic control module to the vehicle wheel alignment system includes electronic ride-height system information.

42. The method of claim 31 for transferring information between a vehicle wheel alignment system and a vehicle electronic control module wherein said diagnostic information from the vehicle electronic control module to the vehicle wheel alignment system includes brake system information.

43. The method of claim 31 for transferring information between a vehicle wheel alignment system and a vehicle electronic control module further including the step of transferring, on said established communications link, at least one command from the vehicle wheel alignment system to the vehicle electronic control module, said at least one command configured to direct the operation of the vehicle electronic control module.

44. The method of claim 43 for transferring information between a vehicle wheel alignment system and a vehicle electronic control module where said at least one command is configured to direct the vehicle electronic control module to store data in an electronic memory associated with the vehicle electronic control module.

45. A method for transferring information between a vehicle wheel alignment system and a vehicle electronic control module, comprising:
 establishing a communication link between the vehicle electronic control module associated with a vehicle and the vehicle wheel alignment system; and
 transferring data on said established communications link from said vehicle wheel alignment system to said vehicle electronic control module.

46. The method of claim 45 transferring information between a vehicle wheel alignment system and a vehicle electronic control module further including the step of storing said data in a data storage device associated with the vehicle electronic control module.

47. The method of claim 45 for transferring information between a vehicle wheel alignment system and a vehicle electronic control module wherein said data includes at least one command, said at least one command configured to direct the operation of the vehicle electronic control module.

48. The method of claim 47 for transferring information between a vehicle wheel alignment system and a vehicle electronic control module where said at least one command is configured to direct the vehicle electronic control module to store data in an electronic memory associated with the vehicle electronic control module.

49. The method of claim 45 for transferring information between a vehicle wheel alignment system and a vehicle computer wherein said step of establishing a communication link includes establishing a wireless communications link between said vehicle electronic control module and the vehicle wheel alignment system.

50. The method of claim 45 for transferring information between a vehicle wheel alignment system and a vehicle computer wherein said step of establishing a communication link includes coupling a data communications cable between said vehicle electronic control module and the vehicle wheel alignment system.

* * * * *